United States Patent [19]

Clough et al.

[11] Patent Number: 5,100,587

[45] Date of Patent: Mar. 31, 1992

[54] SOLID-STATE RADIOLUMINESCENT ZEOLITE-CONTAINING COMPOSITION AND LIGHT SOURCES

[75] Inventors: Roger L. Clough, Albuquerque, N. Mex.; John T. Gill, Miamisburg, Ohio; Daniel B. Hawkins, Fairbanks, Ak.; Clifford L. Renschler, Tijeras, N. Mex.; Timothy J. Shepodd, Livermore, Calif.; Henry M. Smith, Overland Park, Kans.

[73] Assignee: The United States of America as represented by the Department of Energy, Washington, D.C.

[21] Appl. No.: 634,655

[22] Filed: Dec. 27, 1990

Related U.S. Application Data

[62] Division of Ser. No. 435,092, Nov. 13, 1989, Pat. No. 4,997,597.

[51] Int. Cl.$^5$ .............................................. C09K 11/04
[52] U.S. Cl. ........................... 252/646; 252/301.4 F; 252/301.4 P; 252/301.4 R; 252/301.17; 252/301.36; 502/65; 423/DIG. 7; 423/328 T
[58] Field of Search .......... 252/646, 301.4 F, 301.4 P, 252/301.4 R, 301.17, 301.36; 502/65, 73; 423/328 T, DIG. 7

[56] References Cited

U.S. PATENT DOCUMENTS

| | | | |
|---|---|---|---|
| 3,238,139 | 4/1961 | Fischer et al. | 252/646 |
| 3,325,420 | 6/1967 | Futterknecht et al. | 252/646 |
| 3,787,238 | 1/1974 | Juliano | 252/301.36 |
| 3,886,082 | 5/1975 | Hyman, Jr. | 252/301.2 R |
| 3,935,119 | 1/1976 | Barker et al. | 252/301.4 F |
| 4,208,611 | 6/1980 | Watanabe et al. | 313/487 |
| 4,272,300 | 6/1981 | Abbott | 250/304 |
| 4,292,107 | 9/1981 | Tanaka et al. | 156/249 |
| 4,316,817 | 2/1982 | Cusano et al. | 252/301.18 |
| 44,41,049 | 4/1984 | Verstegen et al. | 313/486 |
| 4,508,636 | 4/1985 | Ochiai | 252/301.36 |
| 4,562,158 | 12/1985 | Schellenberg | 436/57 |
| 4,563,297 | 1/1986 | Kukimoto et al. | 252/301.4 R |
| 4,588,698 | 5/1986 | Gruner et al. | 436/535 |
| 4,594,179 | 6/1986 | Harrah et al. | 252/301.17 |
| 4,604,525 | 8/1986 | Kitada et al. | 250/363 R |
| 4,666,692 | 5/1987 | Taramasso et al. | 423/326 |
| 4,681,747 | 7/1987 | Desmond et al. | 423/277 |
| 4,751,148 | 6/1988 | Popma et al. | 428/690 |
| 4,798,768 | 1/1989 | Oversluizen | 428/426 |
| 4,867,905 | 9/1989 | Wunderly | 252/301.17 |
| 4,889,660 | 12/1989 | Jensen et al. | 252/646 |
| 4,902,579 | 2/1990 | Grasselli et al. | 428/610 |
| 4,935,632 | 6/1990 | Hart | 250/486.1 |

OTHER PUBLICATIONS

Breck, Donald W., Zeolite Molecular Sieves, Wiley & Sons, 1974 pp. 176-177, 429, 593.

Strome, D. H. et al, The Effect of Oxygen in Photoluminescence and Resonance Energy Transfer in Copper(I) Y Zeolite, 1980, pp. 156-176.

Leverenz, H., An Introduction to Luminescence of Solids, p. 147.

Huheey, James E., Inorganic Chemistry: Principles of Structure and Reactivity, 3rd Ed., p. 73.

*Primary Examiner*—Brooks H. Hunt
*Assistant Examiner*—Ngoclan Mai
*Attorney, Agent, or Firm*—Armand McMillan; James H. Chafin; William R. Moser

[57] ABSTRACT

A new type of RL light source consisting of a zeolite crystalline material, the intralattice spaces of which a tritiated compound and a luminophore are sorbed, and which material is optionally further dispersed in a refractive index-matched polymer matrix.

9 Claims, No Drawings

SOLID-STATE RADIOLUMINESCENT ZEOLITE-CONTAINING COMPOSITION AND LIGHT SOURCES

This is a Division of application Ser. No. 435,092 filed Nov. 13, 1989, now U.S. Pat. No. 4,997,592.

BACKGROUND OF THE INVENTION

The present invention relates to novel solid state radioluminescent compositions and light sources.

Radioluminescence (RL), or the emission stimulated by radioactive decay, is well known [1]. The phenomenon is widely employed in scintillation detectors, where the quantification of emitted light allows the measurement of radiation fluxes [1,2]. RL is also used in devices to produce light as an alternative to conventional electric light sources. RL lights have typically taken two forms, i.e., gas tubes or paints. In gas tube RL technology [3,4] a glass tube is coated on the inner surface with an inorganic phosphor (such as ZnS), filled with $T_2$ gas, and sealed. The maximum brightness of these lights is bounded: self-attenuation of betas by the tritium gas increases with increasing pressure, so that scaling of light output from these devices by simply increasing the pressure and/or internal volume of the tritium reservoir is limited [4]. In addition, the efficiency of these prior art lights suffer because the phosphor and tritium residues exist in different phases, so that not all beta particles reach a potentially luminescent site in the phosphor. Another practical consideration with this technology is that the tubes are subject to breakage, which raises safety concerns regarding the release of $T_2$. RL paints have typically made use of an inorganic phosphor together with a radioactive isotope such as promethium-147, tritium, or radium-226 [5]. The brightness of such paints is limited by the opacity of the phosphor.

SUMMARY OF THE INVENTION

We have discovered, and provide for herein, novel solid-state radioluminescent compositions and light sources which remove many of the drawbacks associated with prior art radioluminescent compositions and light sources, for example, limited brightness, limited efficiency, and breakage possibilities, The novel radioluminescent compositions and light sources we provide for herein, are based upon the use of either (1) optically clear polymer organic matrixes containing tritiated organic materials and dyes capable of "red" shifting primary scintillation emissions from the polymer matrix, or (2) zeolite crystalline material into which both tritium-containing compound(s) and luminophore(s) are loaded, the material being optionally further dispersed into a polymer or silica matrix.

Specifically, in the present invention, we provide for the following:

1. An optically clear, solid state radioluminescent composition, comprising:

An optically clear polymer matrix; a tritiated organic compound, which is soluble in said matrix, said organic compound containing before tritiation at least some olefinic or alkynylic chemical bonds capable of being reduced by an isotope of hydrogen; and a soluble organic scintillation dye which is capable of transferring a primary scintillitation from said polymer matrix to a red shift emission.

2. A light source comprising the radioluminescent composition recited in paragraph (1).

3. A solid state, radioluminescent composition, comprising:

A zeolite crystalline material which has accepted or loaded or sorbed into at least some crystalline lattice spaces thereof a sorbed tritium containing compound and one or more sorbed luminophores. The sorbed tritium containing compound and luminophore may be one and the same compound. The loaded zeolite may be further suspended in a polymer or silica matrix which is optically clear and which possesses a refractive index close to that of the zeolite material.

4. A light source comprising the radioluminescent composition recited in paragraph (3).

In order to aid those desiring to practice the present invention, the following glossary of terms is provided to remove any vagueness which may exist as to the meanings of such terms when the same are utilized herein.

The term "optically clear polymer matrix" as used herein, means polyacrylics such as polymethylmethacrylate and polyacrylonitrile, polyvinyl/alcohols, and polymers with a high degree of aromaticity such as polycarbonate and cresol-formaldehyde (Novolaks), polystyrene, polyvinyltoluene, polyvinylxylene, polyimides, polyamideimides, polyphenylenes, and polyphenyl/ethers. Generally it is thought that polymer matrixes having a high degree of aromaticity are preferable to utilize in the present invention.

The term "optically clear silica matrix" as used herein means a silica gel formed by polymerization of a silicon and oxygen containing compound (e.g., diethoxysiloxane). A loaded zeolite would be suspended in such a compound during and following its polymerization.

The term "soluble" and "insoluble" as used herein, mean soluble or insoluble in the "optically clear" polymer or silica matrixes chosen, unless otherwise specified.

The term "soluble tritiated organic compound" is use herein with regard to optically clear, solid state radioluminescent compositions and light sources. The term means an organic compound which is exchanged or substituted with tritium atoms and is soluble in the "optically clear polymer matrix" chosen, and that said organic compound before triation may contain at least some (one or more) olefinic (double) or alkynylic (triple) chemical bonds which are capable of being reduced by an isotope of hydrogen. One such preferred organic compound to use in the present invention is p-di(phenylethynyl) benzene.

The term "sorbed tritium containing compound" is used herein with regard to solid state radioluminescent compositions and light sources, which comprise insoluble zeolite comprising crystalline lattice structures. The term includes $T_2O$, $CT_4$, $NT_3$, and $NT_4^+$ as well as certain tritiated organics and tritiated organometallics, it only being necessary that the particular tritium-containing compound chosen be capable of being loaded into the spacing of a zeolite crystal lattice which may comprise optionally sorbed luminophore(s).

The term "soluble radioluminescent organic dye" is used herein in regard to optically clear, solid state radioluminescent compositions and light sources. The term means an organic dye which is soluble in the polymer matrix chosen and which is capable of transferring a primary scintillation from a chosen polymer matrix to a red shift emission. Exemplary of such dyes are phenyloxazoyl-phenyl-oxazole-phenyl (POPOP) trans-stilbene, alpha-naphthylphenyloxazole (NPO), 2-phenyl-5-

(4-biphenylyl)-1,3,4-oxadiazole (PDB), 9,10-diphenylanthracene (DPA), and the like.

The term "zeolite" as used herein means a type of inorganic crystalline material, within the lattice structure of which are contained spaces or pores of atomic or molecular-size dimensions, said pores being capable of retaining or "sorbing" atoms or molecules which are either electrically charged or uncharged. These atoms or molecules comprise the two categories "sorbed tritium containing compound" and "sorbed luminophore", which may be one and the same compound. Zeolites, as used herein, include but are not limited to aluminosilicate, silicate, aluminate, and aluminophosphate materials, either naturally occurring or synthetically prepared.

The term "sorbed luminophore" as used herein encompasses rare earth metal ions such as Eu, Tb, and Nd, and transition metal ions such as Cu; it also encompasses organic compounds such as anthracenes, flavones, and rhodamines, as well as organometallics such as tris(-bipyridyl) -ruthenium; it only being necessary that the chosen material be luminescent and be capable of sorbing into a zeolite crystalline lattice, which lattice may comprise optionally a sorbed tritium containing compound and other sorbed luminophore(s).

The term "olefinic or alkynylic chemical bonds" as used herein, respectively, mean double or triple bonds between two adjacent carbon atoms.

The terms "loading" or "sorbing" are used herein in regard to radioluminescent solid state compositions and light sources, which contain zeolite crystalline structures. The term means the placing of molecules of "sorbed tritium containing compound(s)" or atoms, ions, or molecules of "sorbed luminophore(s)", into at least some crystalline spaces formed in the zeolite crystalline lattice.

DETAILED DESCRIPTION OF THE INVENTION

The novel radioluminescent compositions and light sources disclosed herein are of a solid state nature, i.e., there exists no free $T_2$ gas in the compositions or the light sources. In the case of the optically clear, solid state radioluminescent compositions and light sources, the tritium is covalently bonded to an organic molecule. Such a molecule is advantageously exemplified by the "getter" molecule p-di(phenylethynyl)benzene, to which up to eight (8) separate tritium atoms may attach, upon reduction of all alkynylic bonds therein.

In the case of solid state radioluminescent compositions and light sources which comprise zeolite crystalline lattices, which zeolite lattices additionally comprise "sorbed tritium-containing compounds" and "sorbed luminophores", other "sorbed tritium-containing compounds" and "sorbed luminophores", same or different, can be loaded into crystalline spaces formed in the zeolite crystalline lattice, and thought of as being caged within the confines of the crystalline lattice structure.

While both types of the solid state compositions and light sources disclosed herein, i.e., those that are optically clear versus those that contain zeolite crystalline structures, have tritium incorporated therein, the methods employed for such incorporation are different, and as should be apparent, the resulting products obtained are different. We note, however, that each type of composition and light source of the present invention, nonetheless improves upon prior art radioluminescent light sources by increasing the brightness and efficiency associated with prior radioluminescent light sources, and decreasing the possibility of breakage when compared with prior art radioluminescent light sources.

We now wish to comment upon those compositions and light sources disclosed herein which incorporate zeolite crystalline lattices, and why they represent an improvement over prior art radioluminescent lights.

In prior art radioluminescent lights, there is generally contained tritium gas in sealed cylindrical glass tubes having a coating of an inorganic phosphor (typically ZnS). The brightness of such tube is limited by (1) the self-attenuation of beta decay through the tritium gas, (2) by the 1-2 atmosphere pressure of tritium gas generally attainable within the tube, (3) by the optical attenuation of the phosphor particles, and (4) by geometrical constraints which make the scale of such light systems ineffective. Unlike these prior art light sources, our disclosed zeolite-containing radioluminescent light source incorporates both, a "sorbed tritium-containing compound(s)" and "sorbed luminophore(s)" into the crystalline lattice spaces (cages) formed within the zeolite crystalline lattice structure. In these crystalline spaces, the emitter ("sorbed tritium containing compound") and phosphor ("sorbed luminophore") are held in close proximity within the zeolite crystalline structure, so that an emitter-phosphor interaction takes place within the zeolite crystalline lattice itself, rather than at the surface of a particle.

By utilizing such a system, light production efficiencies are expected to be increased. Additionally, since tritium beta self-attenuation effects are minimized, an efficient scale-up of light intensity is considered possible. Furthermore, we note that our disclosed zeolite containing radioluminescent composition or light source incorporates both emitters and phosphors into the highly radiation-stable zeolite crystalline lattice itself, thus enhancing long-term stability of radioluminescent light source provided.

It is considered most advantageous that the radioluminescent composition which comprises zeolite with sorbed tritium-containing compound(s) and sorbed luminophore(s), be further suspended in an optically clear polymer or silica matrix. Such a matrix should possess a refractive index close to that of the loaded zeolite. The resulting composite suspension should minimize internal reflectance loss of emitted light among the zeolite crystals. Light output from such a composite suspension is thus expected to be enhanced compared to a loose powder. Finally, we note that by utilizing our radioluminescent compositions and lights which contain zeolites, one can encounter a considerable advantage in being able to eliminate the need for a tritiated matrix external to the zeolite lattice, thus reducing the chance of possible damage and yellowing of an optically clear matrix chosen for suspension of zeolite.

Our optically clear, solid state radio/luminescent compositions and light sources, which we provide for herein, also have many advantages over prior art radioluminescent lights. Our optically clear RL system's advantages not only include enhanced brightness, but also simplified means for sealing up brightness, by increasing the dyed polymer's thickness; and probably the most important advantage of all, that by using such a system, our "soluble radioluminescent dyes" (soluble organic luminophores) can limit radiation damage to the chosen polymer matrix.

We also note, that with our optically clear, solid state radioluminescent light system, our calculations have shown that with only one tritium per monomer unit loading in polystyrene, brightnesses on the order of the present RL systems should be obtained with a dyed film of only about 20 micron thickness. Therefore, the potential exists for organic-based RL systems with greater brightnesses of magnitude than currently available with prior art RL systems.

It is thought especially advantageous that one preparing optically clear, solid state radioluminescent compositions or light sources, disclosed herein, should use soluble radioluminescent dyes (soluble organic luminophores) which meet a number of preferred features. These preferred features include high quantum yield of fluorescence, good matrix solubility, low volatility, large Stokes shifts to minimize reabsorption effects, and good radiation stability (such as that afforded by polycyclic aromatics).

We note the use of such soluble RL dyes (soluble organic luminophores) in combination can allow for RL systems of various colors. We also note that it may be useful to use red shifted soluble RL dyes to produce light which is not strongly absorbed by color centers formed due to radiation damage in a polymer matrix.

Methods of producing RL dye loaded polymers include spin-casting, polymerization of luminophore-loaded monomer, or post-polymerization doping with a swelling solvent. We additionally note, it may also be useful to bond a soluble RL dye covalently to the polymer matrix.

The following section is an experimental section, and is included to aid those desiring to practice the present invention. The experimental section is divided into two parts. Part I is directed to our disclosed optically clear, solid state radioluminescent compositions and light sources. Part II is directed to our solid state, radioluminescent compositions and light sources which contain zeolite crystalline lattice structures.

EXPERIMENTAL SECTION

PART A

Optically Clear, Solid State Radioluminescent Compositions and Light Sources.

Three principal issues must be addressed in designing an optically clear, solid state radioluminescent light: covalent bonding of tritium into the matrix, development of an organic material for efficient light production, and good radiation stability of the complete system. We discuss each of these in turn.

A convenient method for loading substantial amounts of covalently-bound tritium into an optically clear organic matrix is accomplished using p-di(phenylethynyl)benzene (DEB)[6]. $H_2$ (or $T_2$) adds efficiently across the ethynyl linkages in the presence of Pd catalyst loaded on carbon black [6-7]. The tritiated compound, when separated from the catalyst, can be incorporated as a soluble additive in a solid macromolecular material. At the stoichiometric limit, eight atoms of tritium add to each DEB molecule, giving 8% tritium by weight. With care, loading to about 95% of this limit can be achieved [6]. The hydrogenated (or tritiated) DEB is soluble to about 20% by weight in styrene monomer, the precursor to the solid organic matrix, giving a maximum tritium loading in that matrix of about 1.6% by weight, or 160 curies/g. For our initial experiments, only about 6% of the maximum tritium loading was used (total of 50 curies in 5 ml of solution, or 10 curies/g).

Efficient light production from irradiation of organic matrices requires appropriate energy capture and transfer. As tritium decays, energetic beta particles promote bound electrons in the matrix to excited states. The excitation of sigma bond electrons results in no output of usable light, while the excitation of $\pi$ bond electrons can result in the emission of UV light. In order to increase the fraction of $\pi$ electrons in the system, as well as to increase radiation stability (vide infra), a highly aromatic matrix such as polystyrene is desirable. However, polystyrene emits in the UV portion of the spectrum, and with very low quantum yield [8]. In order to create a device which efficiently emits light of a chosen wavelength, we make use of scintillant dyes that are soluble in the organic matrix. These compounds redshift the excitation energy, in step-wise fashion, to the final desired wave-length. Efficient Firster transfer is desired, so that energy can be moved from donor to acceptor before radiationless decay. This reduces cumulative efficiency losses which would otherwise arise from low quantum yields of emission in each successive intermolecular energy-transfer step. This necessitates maximizing the probability of energy transfer between dyes, by ensuring that the emission spectrum of each dye closely overlaps the absorption spectrum of the next most red-shifted dye. Dyes of high solubility are needed, since sufficiently high solute concentrations are necessary to minimize the distance between donor and acceptor molecules. The terminal emitter species chosen (i.e., the dye of lowest energy) is selected to fluoresce with very high quantum efficiency.

It is desirable that each dye possess a significant Stokes shift (i.e., a large separation between absorption and emission maxima). Not only does this accomplish a strong red-shift of the energy, but it also minimizes self-absorption effects and hence minimizes radiationless energy loss [9]. A final consideration in selection of dyes was the anticipated radiation resistance of selected molecular structures: high aromaticity, and the absence of functional groups susceptible to reaction by free-radical mechanism, are desirable features.

The optically clear polymer matrix, in which organic dye(s) and tritiated organic compound(s) are dissolved, should also have resistance to the yellowing and mechanically degrading effects of beta radiation. High aromaticity is considered essential for this resistance. Polymers such as polystyrene are chosen for this property as well as the UV emission discussed above.

In principle, the organic tritium light source can be designed to emit anywhere in the UV, visible or IR. For the present set of experiments, we wished to produce green light having a wavelength that matched the maximum sensitivity of the human eye. We also prepared a blue light; an appropriate formulation was achieved using 2-phenyl-5-(4-biphenylyl)-1,3,4-oxadiazole (PBD), together with 9,10-diphenylanthracene (DPA).

Our first organic RL lights used a glass fixture with both inner and outer tubes. A powdered mixture of DEB with Pd on carbon catalyst was placed in the inner tube. The inhibitor-free styrene solution, in which the appropriate dye molecules had been dissolved, was placed in the outer tube. Following a freeze-pump-thaw cycle to remove oxygen from the styrene solution, tritium gas was introduced and the fixture sealed. After 16 hours (the known time for the DEB-catalyst mixture to react with this amount of tritium gas) [6], fixture was inverted to mix the contents of the tubes. With agitation, the tritiated DEB dissolved in the styrene. After the catalyst was allowed to settle, the clear organic supernatant was observed to glow. Over a period of about a week, the solutions became increasingly viscous and finally solidified. The polymerization process, which is desired for producing a solid state tritium light source, can be readily accelerated (if desired) by heating the samples with or without the addition of a free radical initiator (such as azobisisobutyronitrile [AIBN]).

Since a goal of the present experiment was to produce a light with the greatest possible brightness as observed by the eye, luminance (photopic brightness) measurements were made on one blue and five orange lights. The orange lights averaged 0.2 ft-L (2.2E-4 lamberts), while the blue emitter was estimated to produce ca. 0.1 ft-L. Since the tritium loading used here was a factor of 16 below the maximum level possible with DEB in styrene, and since no light collection scheme was used (e.g., a reflective backplane), we expect the production of lights of 3 fL or more to be readily achievable using the current chemical system and thicker samples. In contrast, it is difficult to produce gas tube lights of this size with a brightness greater than 1.5 ft-$L_{10}$. Further experiments are planned to realize brighter organic RL systems.

In addition to using "getter" molecules such as p-di(phenylethynyl)benzene in the above all organic matrixes, it is envisioned herein that a "getter" molecule could be utilized as a carrier to incorporate tritium into an inorganic phosphor matrix, which would comprise for example, ZnS, ZnO or some other metal oxide and/or silicate. Such an "inorganic matrix/getter molecule" composition (i.e., a composition consisting of an inorganic phosphor matrix carrying a tritiated organic compound containing before tritation olefinic or alkynylic chemical bonds capable of being reduced by an isotape of hydrogen) of course, could be used to prepare a light source, and the same is considered encompassed herein.

Additionally, such an inorganic phosphor matrix "getter" molecule composition, if so desired, could be dispersed as small particles in a suitable organic matrix, so as to provide for a solid state radioluminescent composition or light source having high optical clarity. In such a composition or light source, one could make use of an organic matrix, which is index matched to the phosphor inorganic matrix, to further aid in obtaining high optical clarity.

PART B

Solid State, Radioluminescent Compositions and Light Sources Containing Zeolite Crystalline Lattice Structures To improve upon traditional $T_2$ gas/ZnS/glass tube sources, an increased proximity of T atoms and luminescing centers, as well as greater tritium and luminophore loading density, all within an optically clear matrix, have been considered. As one approach to such improved RL sources, a number of new solid state zeolite matrixes have been prepared, several of which have been loaded with tritium.

Types 4A and 13X zeolites were purchased from Linde Co. as $-600$ mesh crystalline powder. The sodium ($Na^+$) present in the material was ion exchanged with various rare earth ions. A typical procedure entailed slurrying 1 gram samples of zeolite in water for 20 hours at 60° C. with approx. 1.5 gram of dissolved rare earth nitrate salt. In this way, the following exchanged zeolites were prepared: Ce·X, Pr·X, Nd·X, Sm·X, Eu·A, Eu·X, Gd·X, Tb·A, Tb·X, Dy·X, Ho·X, Er·X Tm·X, Yb·X, and Lu·X where all rare earths were in their trivalent state.

Analysis of Tb·X, and Tb·A showed rare earth incorporation to be 76%, 63% and 55%, respectively, on an equivalent ionic charge basis, the remainder being $Na^+$.

Screening of the materials above was performed with a UV lamp emitting at 365n/m. The Eu- and Tb-loaded materials fluoresced most strongly in the visible, the former red and the latter yellow-green. According to the literature, the Nd-exchanged material should fluoresce at around 1060n/m in the near-IR. The Eu·A and Tb·X samples were chosen for further investigation with tritium.

Red Light

Eu·X, 52 mg, was placed in a glass ampoule and dried by evacuation at 400° C. for 1 hour. The vapors above degassed liquid tritiated water (99% pure $T_2O$) were then allowed to expand into the ampoule and sorb onto the zeolite (which acts as a "pump" for water vapor). The zeolite was cooled for 2 minutes to 77°K to enhance the pumping speed. Active cooling was removed and the collected $T_2O$ ice allowed to melt; water was noted to "supersaturate" the zeolite, that is, zeolite crystallites were surrounded by liquid $T_2O$ water. In this state, the matrix emitted 0.9–1.0 ft-Lambert of red light as measured by a Minolta model LS-110 photometer, an instrument corrected for the human photopic response curve. The "supersaturated" zeolite was then warmed to 40° C., while the $T_2O$ source was frozen at 77°K. After 5 minutes, both active heating and cooling were removed and the materials allowed to equilibrate overnight. The zeolite powder, now loosely flowing, but "saturated" with about 36 Ci of tritium as $T_2O$ vapors, emitted 0.50 ft-Lambert red light at about 630 nm.

Yellow-Green Light 53 mg of the Tb·X material was taken into a freshly prepared and cleaned ampoule. This material was dried in vacuum for 3 hours to 335° C. and then brought into contact with the vapors of freshly-degassed pure $T_2O$. Within a day, luminance of the sample reached 0.65 ft-Lambert at about 550 n/m. Over the next two weeks, as the sample became saturated with $T_2O$ and (presumably) as residual zeolite OH groups exchanged to OT species, output grew to 0.77 ft-Lambert. This light output was also measured via a Minolta model LS-110 instrument. Total tritium content at saturation was calculated to be 36 Ci.

Additionally, we note, present applications of RL lighting include emergency exit lights in commercial aircraft, and luminous instrumentation (such as watch dials and gun-sights). Many other potential applications for long-term, steady-state, non-electric light sources can be envisioned, particularly involving remote locations where electricity is not readily available, or emergency systems that must function reliably during electric power failure. An application of current interest is for landing lights at remote runways. We also note that the low energy betas from tritium are effectively attenuated by thin layers of materials (the attenuation length is less than 1 micron in both the organic and glass components), so that tritium lights, such as the ones we have provided, emit negligible quantities of penetrating radiation to the external environment.

The present invention is only to be limited by the scope of the claims appended hereto.

REFERENCES

1. E. Schram and R. Lombaert, "Organic Scintillation Detectors" (Elsevier, Amsterdam, 1963).
2. D. Clark, Nuc. Instrum. Meth. 117, 295 (1974).
3. A. Korin, M. Givon, and D. Wolf, Nuc. Instrum. Meth. 130. 231 (1975).
4. L. Bursics, T. Forster, A. Szabo, and K. Kollar, Hungarian Patent No. 180,569/A, Mar. 28, 1980.
5. "Radiation Protection Standards for Radioluminescent Timepieces", Safety Series No. 23, IAEA, Vienna (1967).
6. H. M. Smith and T. J. Shepodd, unpublished data.
7. R. L. Courtney and L. A. Harrah, J. Mater, Sci. 12, 175 (1977).
8. I. B. Berlman, "Handbook of Fluorescence Spectra of Aromatic Molecules" (Academic, New York, 1971), second ed.
9. C. L. Renschler and L. A. Harrah, Nuc. Instr. Meth. Phys. Res. A235, 41 (1985).
10. J. A. Tompkins, private communication.

What is claimed is:

1. A solid state radioluminescent composition or light source, comprising:
    an optically clear polymer matrix, having a crystalline zeolite material, into the crystalline intralattice spaces thereof which have been sorbed at least one tritium containing compound and at least one luminophore.

2. A solid state radioluminescent composition or light source, comprising a crystalline zeolite material having at least one tritium-containing compound and at least one luminophore occupying its intralattice spaces.

3. The light source of claim 2, wherein (a) the tritium-containing compound is selected from the group consisting of $T^+$, $T_2O$, $CT_4$, $NT_3$, $NT_4^+$, and tritiated organics and tritiated organometallics capable of being loaded in the zeolite lattice spaces, and (b) the luminophore is selected from the group consisting of rare metal ions, copper ions, and luminescent organic compounds capable of being sorbed in the zeolite lattice spaces.

4. The light source of claim 2, wherein tritium-exchanged 3-hydroxyflavone occupies the intralattice spaces, said flavone being a molecule which contains tritium and is a luminophore.

5. The light source of claim 3, wherein the luminophore is selected from the group consisting of ions of europium, terbium, neodymium, and copper.

6. The light source of claim 2, wherein the composition is present within an organic or silica polymer matrix, in which matrix the zeolite is insoluble but which matrix possesses a refractive index within 0.05 units of that of the crystalline zeolite material.

7. The light source of claim 2, wherein the crystalline zeolite material consists of large crystallites with dimensions greater than 1 mm.

8. The light source of claim 6, wherein the matrix is an organic polymer and the composition is present within a solvent for coating applications.

9. The light source of claim 6, wherein the matrix consists of two-part organic thermosetting polymer precursors for coating applications.

* * * * *